(12) United States Patent
Panchaksharaiah et al.

(10) Patent No.: US 12,537,995 B2
(45) Date of Patent: Jan. 27, 2026

(54) SYSTEMS AND METHODS TO ADAPT A SCHEDULE TO BE PLAYED BY A MEDIA PLAYER

(71) Applicant: Adeia Guides Inc., San Jose, CA (US)

(72) Inventors: Vishwas Sharadanagar Panchaksharaiah, Karnataka (IN); Vikram Makam Gupta, Karnataka (IN); Gyanveer Singh, Bangalore (IN); Reda Harb, Bellevue, WA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 17/866,145

(22) Filed: Jul. 15, 2022

(65) Prior Publication Data

US 2024/0022791 A1    Jan. 18, 2024

(51) Int. Cl.
*G10L 15/22* (2006.01)
*G10L 15/18* (2013.01)
*H04N 21/442* (2011.01)
*H04N 21/458* (2011.01)
*H04N 21/472* (2011.01)

(52) U.S. Cl.
CPC ....... *H04N 21/458* (2013.01); *G10L 15/1815* (2013.01); *G10L 15/22* (2013.01); *H04N 21/44218* (2013.01); *H04N 21/47217* (2013.01)

(58) Field of Classification Search
CPC ........... H04N 21/458; H04N 21/44218; H04N 21/47217; G10L 15/1815; G10L 15/22
See application file for complete search history.

(56) References Cited

U.S. PATENT DOCUMENTS

| 7,165,098 | B1 | 1/2007 | Boyer et al. | |
| 7,761,892 | B2 | 7/2010 | Ellis et al. | |
| 8,046,801 | B2 | 10/2011 | Ellis et al. | |
| 2002/0174430 | A1 | 11/2002 | Ellis et al. | |
| 2004/0255336 | A1* | 12/2004 | Logan | H04N 21/4663 |
| | | | | 725/38 |
| 2005/0251827 | A1 | 11/2005 | Ellis et al. | |
| 2012/0011545 | A1* | 1/2012 | Doets | H04N 21/8153 |
| | | | | 725/38 |
| 2014/0259033 | A1* | 9/2014 | Ramaswamy | H04N 21/4436 |
| | | | | 725/12 |
| 2015/0347416 | A1* | 12/2015 | Lin | H04N 21/47214 |
| | | | | 707/751 |
| 2017/0134803 | A1* | 5/2017 | Shaw | H04N 21/234363 |
| 2019/0268645 | A1* | 8/2019 | Fuetsch | H04N 21/8456 |

* cited by examiner

*Primary Examiner* — Rong Le
(74) *Attorney, Agent, or Firm* — HALEY GUILIANO LLP

(57) ABSTRACT

Systems and methods are provided for adapting playout of a plurality of media items. One example method includes receiving one or more inputs representing a conversation between an audience of two or more people experiencing the playout of the plurality of media items, processing the input to determine a level of engagement of the audience with the playout of at least one of the plurality of media items, and adapting playout of the at least one of the plurality of media items before the scheduled start of the next media item in the schedule to take account of the inputs representing the conversation.

19 Claims, 9 Drawing Sheets

500

SYSTEMS AND METHODS TO ADAPT A SCHEDULE TO BE PLAYED BY A MEDIA PLAYER

BACKGROUND

The present disclosure relates to systems and methods of adapting a schedule of a plurality of media items to be played by a media player and, more particularly, to methods and systems of adapting a schedule of a plurality of media items to be played by a media player based on a conversation between an audience experiencing the playout of the plurality of media items.

SUMMARY

In both virtual group watching scenarios and physical group watching scenarios, viewers tend to chat amongst one another. Occasionally, such chats can lead to longer conversations during the playback of media items. Some examples of when this can occur include starting a conversation if the media item boring, or during an advertisement break. Alternatively, the viewers may start a conversation about the specific scene or media item being played at the present time (such as a famous fighting scene in a movie). If the conversation was started because of a boring media item, and if conversation is still going on even after the boring media item is over and an interesting media item is started, then viewers will miss those interesting media items. One possible solution is to alert viewers (for example by playing back a chime) that an interesting section is about to start, to prevent the viewers from missing the upcoming interesting sections. However, this would lead to an abrupt end to the conversation. Moreover, there remains a risk that such a system would alert viewers even if only a small chat is occurring between the viewers, as opposed to a conversation. Accordingly, there is a need in the industry for a system to determine between small chats and longer conversations, and for a system to adapt playout of media items, such that viewers do not miss interesting section of media, without abruptly interrupting those conversations.

Accordingly, systems and methods are described herein for determining identifying conversations during the playback of media and adapting the playout of media items within the media without abruptly interrupting the conversations. In accordance with some aspects of the disclosure, a first method is provided. The first method includes, receiving one or more inputs representing a conversation between an audience of two or more people experiencing the playout of the plurality of media items, and processing the input to determine a level of engagement of the audience with the playout of at least one of the plurality of media items. Playout of the at least one of the plurality of media items is subsequently adapted before the scheduled start of the next media item in the schedule to take account of the inputs representing the conversation. This addressed the problem of identifying conversations during the playback of media, and adapting the playout of media items within the media without abruptly interrupting the conversations In some example methods, the duration of the conversation can be determined, based on the inputs representing the conversation. This may include feeding the inputs representing the conversation into a speech recognition program, and/or feeding the inputs representing the conversation into a natural language program. Based on a predicted length of conversation the system can enhance user experience. For example, if the length of conversation indicates that the conversation will end after current media item and interesting media item might already started by, then the system can postpone the interesting media item to keep the conversation alive and end gracefully. Furthermore, based on length of conversation, the system can keep the same theme and ambience of current media items so that viewers' conversation can go as it is. Further still, if Ads were playing, then the system can continue to play Ads until the end of the predicted length of conversation. If the prediction reveals the conversation will end before the current boring media item, then the system can automatically play boring media item in background with increased speed.

In some example methods, processing the input to determine the level of engagement of the audience with the playout of the at least one of the plurality of media items may further comprise processing the input to determine a topic of the conversation, comparing the topic of the conversation with the playout of the at least one of the plurality of media items, determining whether the topic of the conversation relates to the playout of the at least one of the plurality of media items, and calculating the level of engagement based on whether the topic of the conversation relates to the playout of the at least one of the plurality of media items. Advantageously, this allows for the system to determine genuine conversations and adapt the playout of the media items based on the topic(s) of the conversations. For example, determining if a conversation happens around a topic or scene/media item they are currently watching or about an actor, location, related content etc. The system can use Digital assistants like Alexa or Google Home which can listen to the conversation and understand if conversation is free flow or around a topic. Such Digital Assistants can notify system about the start of conversation and the topic.

In some examples of the method, calculating the level of engagement can further include determining a high level of engagement of the audience if the comparison of topic of the conversation and the playout of the at least one of the plurality of media items is above a predetermined threshold or determining a low level of engagement of the audience if the comparison of the topic of the conversation and the playout of the at least one of the plurality of media items is below the predetermined threshold. In response to determining a low level of engagement, the playout of subsequent media items determined to be of interest to one or more members of the audience can be delayed. Advantageously this allows for an improved determination of genuine conversations occurring and can allow the system to more accurately adapt the playout of the media items based on the topic(s) of the conversations.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Systems and methods are described herein for determining identifying conversations during the playback of media and adapting the playout of media items within the media without abruptly interrupting the conversations. Media items include audio, video and/or any other media content. Audio includes audio-only content, such as podcasts, stories and music. Video includes audiovisual content such as movies and/or television programs. A media item may comprise a number of portions, or chapters. These portions may be identified in metadata associated with the media item and may include titles and/or descriptions related to the content of the portion. The media item may be of any suitable known format. One example of a suitable media item is one that complies with the MPEG DASH standard.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), a solid-state drive (SSD) etc.

Figure 1:
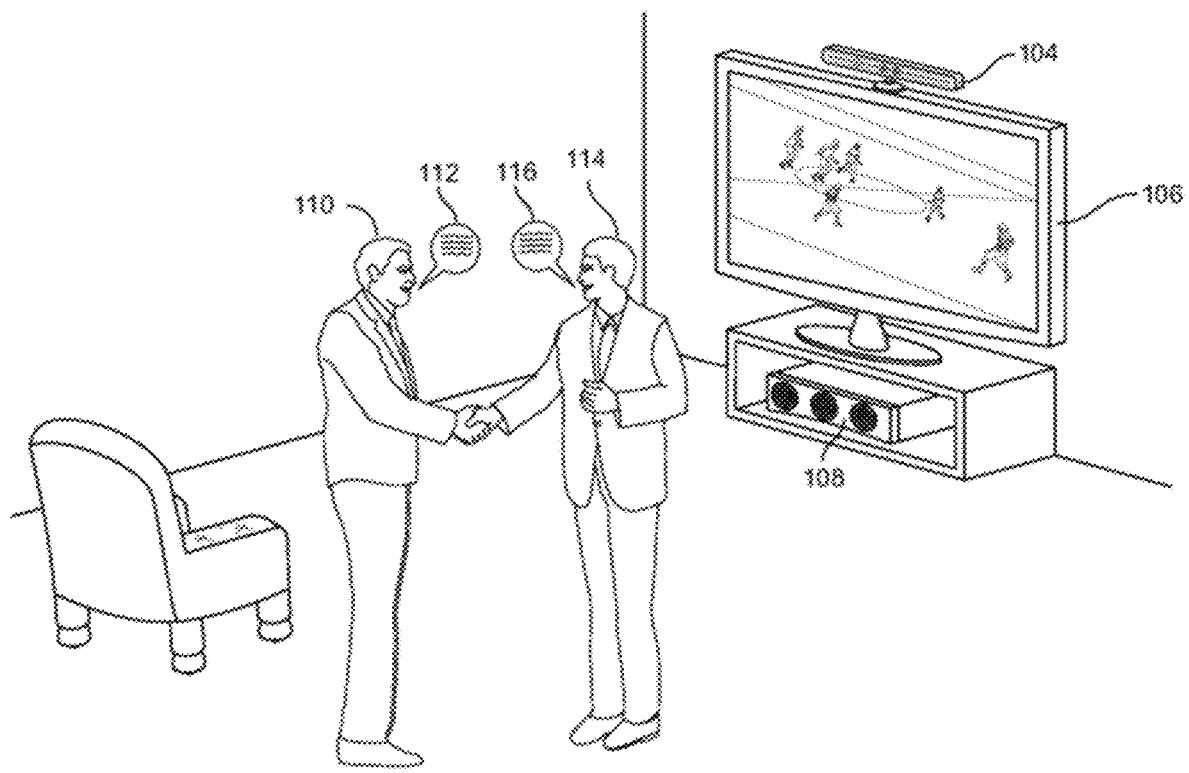
FIG. 1 shows an example scenario of two people having a conversation in the presence of a media device, in accordance with some embodiments of the disclosure.

FIG. 1 shows an example environment 100 of an audience (for example, two people 110 and 114) watching media on a media device 106 (for example, a television) whilst engaging in a conversation (for example, as depicted by reference numerals 112 and 116 in FIG. 1). In FIG. 1, media device 106 may comprise a display screen, a microphone and/or a camera. The display screen, microphone and/or camera may be integrated within the media device 106 or may be housed in a separate enclosure 104 and in communication with the media device 106 (for example, by a wireless connection or by cable). Media device 106 may comprise one or more speakers to project sound toward the users. In some examples, the speakers may be external speakers 108 which are in communication with the media device 106 (for example, by a wireless connection or by cable).

Media as discussed throughout this specification refers to any sort of audio, visual or audio-visual content which can be played back by a media device, such as media device 106. Media comprises one or more media items as part of a schedule, wherein a media item may be a movie or television show, an advertisement, a song, a music video, or any other type of content that can be played back by a media device. Moreover, a media item can refer to a specific part or timeframe within a schedule, advertisement, song, music video, or other type of content. For example, a media item may be a specific scene within a movie (for example, a famous fight scene).

In the example of FIG. 1, the two people 110, 114 are chatting with each other which may last for a few seconds or can lead to a longer conversation. The microphone and/or camera of the media device 106 can receive one or more inputs (for example, spoken words 112 as coming from viewer 110 and spoken words 116 from viewer 114). In return, the microphone can turn speech into electrical signals which may be digitized, and encoded, and the encoded speech can be passed to the processing system (not shown). In some examples, the processing system may be part of the media device 106 or may be part of a server separate from the media device 106. The processing system can receive the one or more inputs (for example, through an input/output channel) and determine that a conversation is occurring between the two people 110, 114 (for example, by determining the topic and relevance of the conversation as will be discussed in more detail below). Once it has been determined that a conversation is occurring between the two people 110, 114, the system may process the conversation to determine how engaged the two people 110, 114 are with the playout of the present media item. This may include detecting (for example, with use of machine learning and/or digital assistants such as Alexa or Google Home) whether the conversation is a free flow conversation or around a specific topic. Moreover, the system can detect whether the conversation's topic is about a scene/media item they are currently watching or about an actor, location, related content etc. Alternatively, this may include detecting that the conversation's topic is outside of the media item (for example, about buying new property in town).

Although only two people 110, 114 are shown in FIG. 1, the present disclosure is not limited to detecting conversation between two people and can detect conversation involving more than two people. Moreover, FIG. 1 depicts the two people 110, 114 as being in the same room (i.e., in a physical watch group). The present disclosure can also detect conversations occurring between two or more people virtually (for example, by two or more people streaming the same content to two different media devices) as will be discussed in more detail below.

Once it has been determined that a conversation is present, the system can adapt playout of the present media item and/or the one or more succeeding media items in the schedule of media items. For example, based on the start of the conversation, the system can determine the media item which is currently being played at media device 106 (for example, is the conversation occurring during playback of a specific scene in a movie, or during an advertisement break?) and determine (for example, based on metadata as will be described in more detail below) whether the media item that is currently being played at media device 106 is relevant or irrelevant. The system can further determine the duration of current media item (for example, by accessing the metadata of the schedule received from the server) and determine what media item is scheduled to be played back by the media device 106 next. If it is determined that the current media item and the next media item are relevant, then the system can postpone the next media item's playback (for example, by inserting an irrelevant media item as the next scheduled media item). Alternatively, if it is determined that the current media item and the next media item are irrelevant, then the system can prolong the current and/or the next media item's playback until the conversation is over, and then insert the next relevant media item. This process and ancillary parts of the process will be described in more detail below. Generally, if the current media item is less relevant (for example, it's boring), the conversation tends to be lengthier. If two experts are discussing a familiar topic, then conversation also tends to be lengthier. Alternatively, if viewers are very much engaged to the schedule (and/or present media item) then the conversation tends to be shorter because they want to pay attention to the schedule. Therefore, ensuring the correct media item is played back at the right time is beneficial to attract viewership and to prevent conversations from being abruptly ended.

In some arrangements, the system can keep track of the conversations which are happening during the playback of the schedule. The system can store the topic, the profile of the participating viewers (for example, people 110, 114), the one or more media items which were playing when the conversation was happening, the type of conversation that followed (if the type of conversation changed) and when the conversation ended. Based on any combination of the above factors, for a given set of viewers who are conversing and for a given segment, which is playing, the system can apply machine learning algorithms on similar viewers on similar/same topic with similar engagement level to predict the length of the conversation. For example, based on the history of past conversations around similar viewers around a famous scene of a movie, the system can fairly predict the length of conversation for a given set of different viewers watching the same famous scene of the same movie. This will be described in more detail below.

Predicting the length of conversation allows for an enhanced user experience. For example, if the predicted length of conversation indicates that it will end after the current media item segment and a relevant media item (for example, the start of a movie and/or the start of an interesting section of a movie) might already have started by that point, the system can postpone the relevant media item to keep the conversation alive and allow for the conversation to end gracefully. Based on the length of the conversation, the system can keep the same theme and ambience of current media items so that viewers' conversation can go as it is. Furthermore, if advertisements are playing while the conversation is taking place, then system can continue to play advertisements until the conversation is over. Moreover, if one or more advertisements are determined to be relevant, then those advertisements can be postponed until the conversation is predicted to be over. In a further example, if an irrelevant media item segment is playing during the conversation, then system can choose not adapt playout of that media item with drastic difference until the conversation is predicted to be over. Further still, if the prediction reveals that the conversation will end before the current irrelevant media item, the system can automatically play the irrelevant media item in the background with increased speed to ensure that the conversation ends roughly at the same time as the irrelevant media item, thereby allowing playout of the next relevant media item to coincide with the end of the conversation. This will be described in more detail below, with particular reference to FIGS. 5 to 9.

Figure 2:
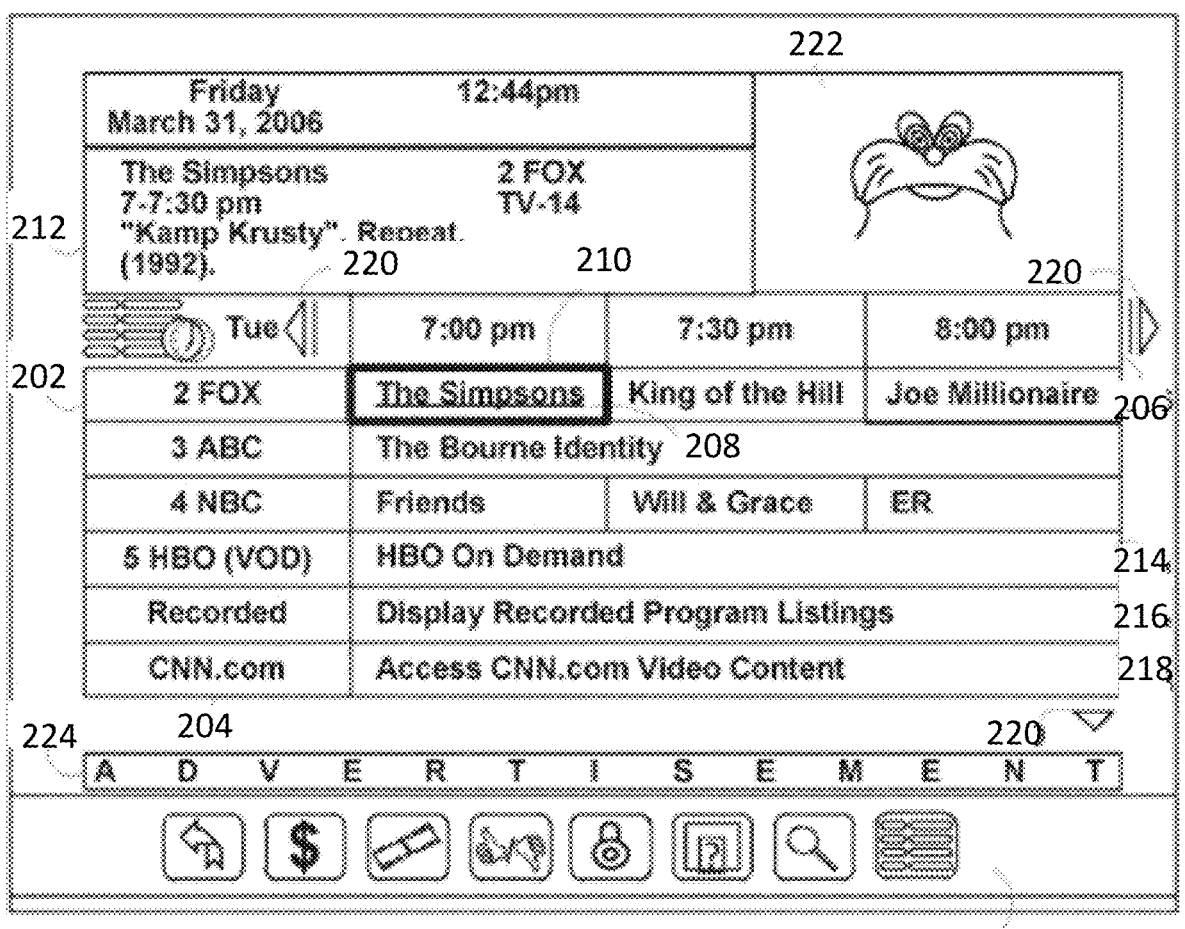
FIG. 2 shows an illustrative example of a media guidance display that may be presented in accordance with some embodiments of the disclosure.
Figure 3:
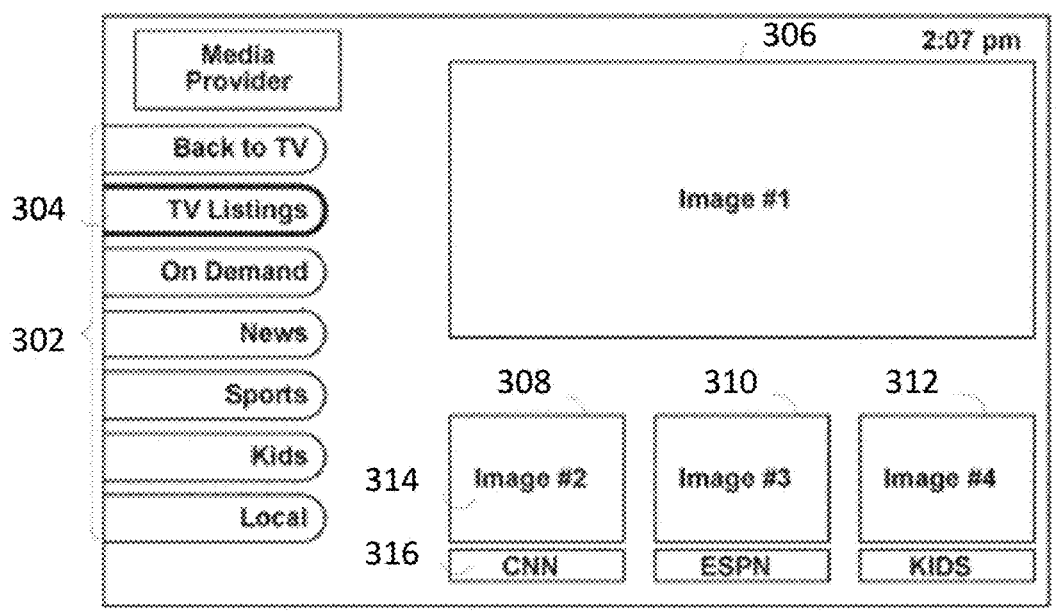
FIG. 3 shows another illustrative example of a media guidance display that may be presented in accordance with some embodiments of the disclosure.

FIGS. 2-3 show illustrative display screens (such as media device 106 as discussed above with reference to FIG. 1) that may be used to provide media guidance data, such as media items as part of a schedule as discussed above with reference to FIG. 1). The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U. S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U. S. Patent Application Publication No. 2010/0153885, filed Nov. 12, 2009, which is hereby incorporated by reference herein in its entirety.

Figure 4:
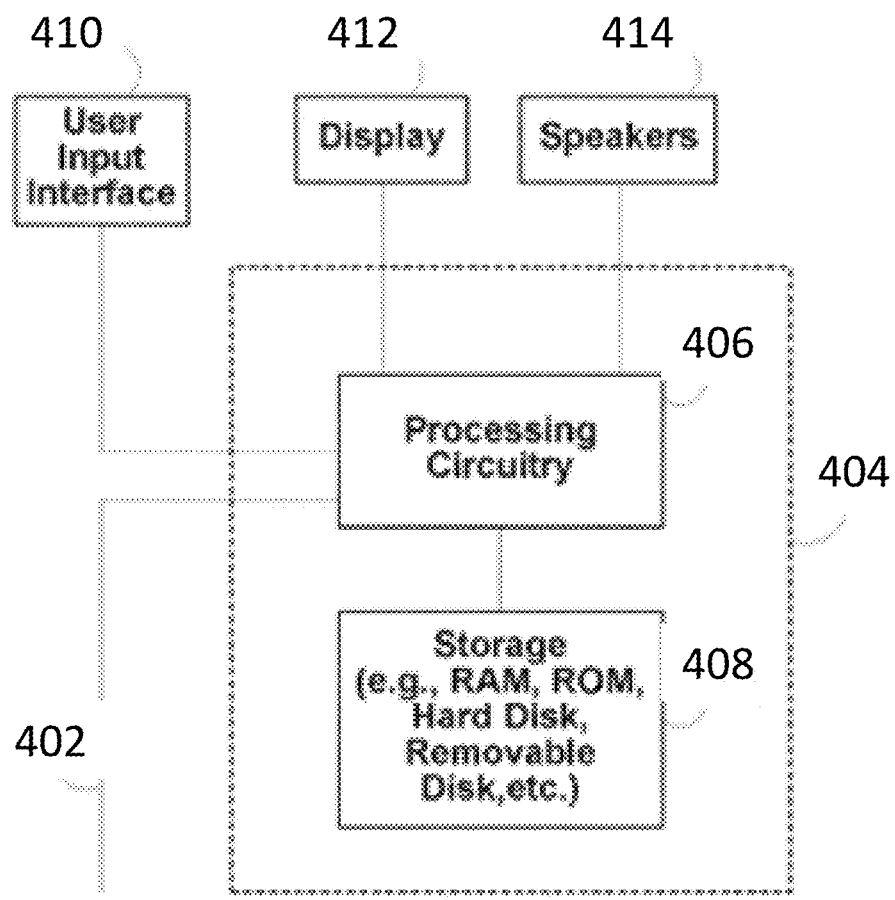
FIG. 4 shows a block diagram of a media device and of control circuitry comprising a processor and memory, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Control circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and media item of a schedule.

Content source 516 may comprise a plurality of media items as part of one or more schedules (as described above with reference to FIGS. 1 to 5). In some examples, the media source may be stored on a server which is separate to the media device 106, the communication network 514 and the processing server. In other examples the media source may be stored on an any one of the media device 106, the communication network 514, and/or the processing server.

Figure 5:
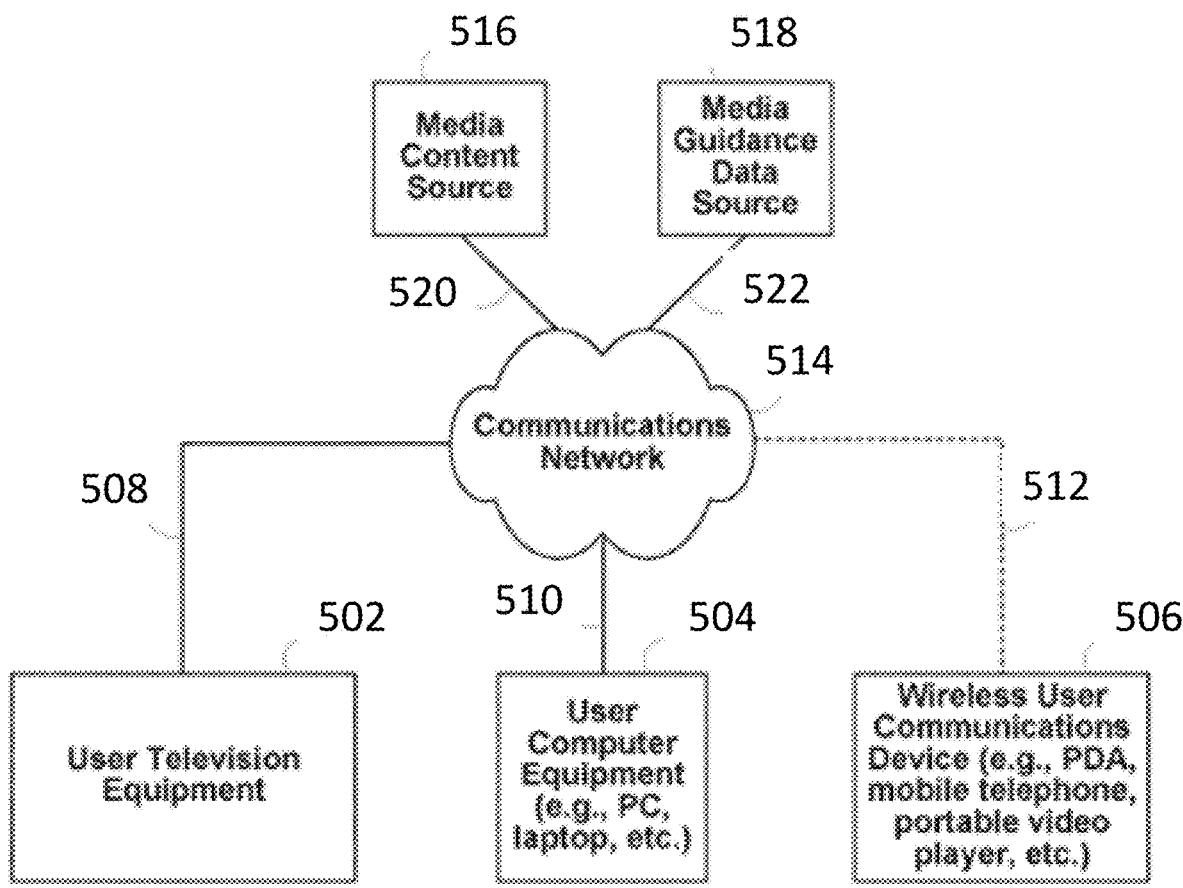
FIG. 5 shows a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. The user television equipment 502, user computer equipment 504, wireless user communications device 506, or any other type of user equipment suitable for accessing content may be substantially similar to media device 106, and/or display 412 as described above with reference to FIGS. 1 and 4. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-1 lx, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Content source 516 may comprise a plurality of media items as part of one or more schedules (as described above with reference to FIGS. 1 and 4). Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment 502, 504, and 506 are shown as through communications network 514, in some embodiments, sources 516 and 518 may communicate directly with user equipment 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast schedules for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Media device 106 can playback media items (as described above) received from the media source by way of the communication network. In some examples, media device 106 may receive input parameters (for example, inputs from a display, microphone and/or a camera as described above with reference to FIGS. 1 to 5) which can be used to determine by the media device 106 or by a separate server (for example, processing server not shown) the presence of a conversation as well as predict the length of the conversation between viewers of media items played back on the media device 106. The presence of a conversation between viewers as well as the prediction of the length of the conversation between viewers of media items played back on the media device 106 can be determined by feeding the input into a machine learning algorithm (stored on the media device 106, processing server not shown, or a different server that is in communication with the communication network 514) which is operable to compare the input with a plurality of parameters to determine if a conversation is present and to predict the length of that conversation, as discussed above with reference to FIGS. 1 to 5.

Figure 6:
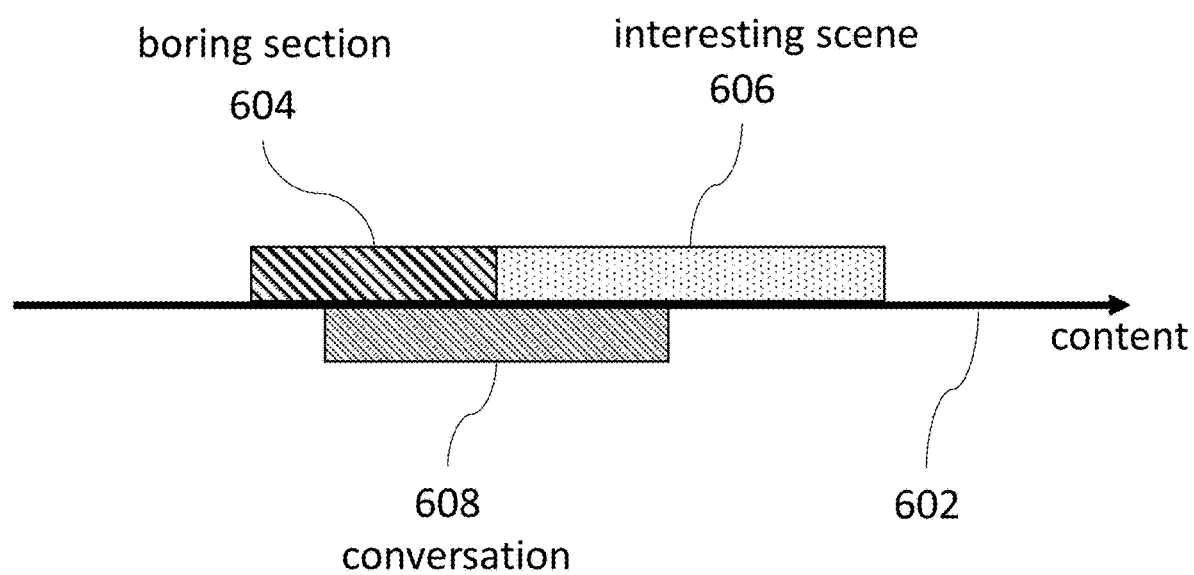
FIG. 6 shows an example timeline of a plurality of media items being played back and an overlapping viewer conversation, in accordance with some embodiments of the disclosure.

FIG. 6 shows an example timeframe 600 of a plurality of media items 604, 606 being played back to a plurality of viewers alongside a conversation 608 occurring throughout playback of the media items 604, 606, as discussed above with reference to FIGS. 1 to 5. The media items 604, 606 as well as the conversation 608 are marked along a time-axis 602 (along the x-axis) labelled "content" and represents time moving forward. Media item 604 refers to an irrelevant media item (for example, a boring section during a movie, and/or an advertisement that is not relevant to the viewer(s)). Media item 606, which succeeds media item 604, refers to a relevant media item (for example, an interesting scene in a movie, and/or an advertisement that is relevant to the viewer(s)).

In the example shown in FIG. 6, a conversation 608 is detected by the system after the irrelevant section 604 has begun. The conversation may be detected as discussed above with reference to FIGS. 1 to 5. Furthermore, the conversation 608 is predicted to end (for example, by the systems and processes as described above with reference to FIGS. 1 to 5 and below with reference to FIGS. 7 to 9) well into the playback of relevant media item 606. In this example, the system may adapt playout of the media items 604, 606 in a number of ways to prevent conversations from being abruptly ended while ensuring that relevant media items are not missed by the viewers. For example, irrelevant media item 604 can be slowed down such that it ends when the conversation is predicted to be over. Alternatively or additionally, a portion of media item 604 may be repeated to fill in the gap between the scheduled end of media item 604 and the scheduled start of media item 606. In either example, the relevant media item 606 may be postponed such that the start time of relevant media item 606 coincides with the predicted end time of the conversation. Accordingly, the conversation is allowed to end gracefully, and the relevant media item 606 receives the viewers undivided attention.

The example timeframe 600 may include any number of media items and is not limited to the two media items 604, 606 as depicted in FIG. 6. Moreover, the example depicted in FIG. 6 is not intended to be limiting in any way and is, instead, intended to be an illustrative example of the systems and processes described above with reference to FIGS. 1 to 5 and below with reference to FIGS. 7 to 9.

Figure 7:
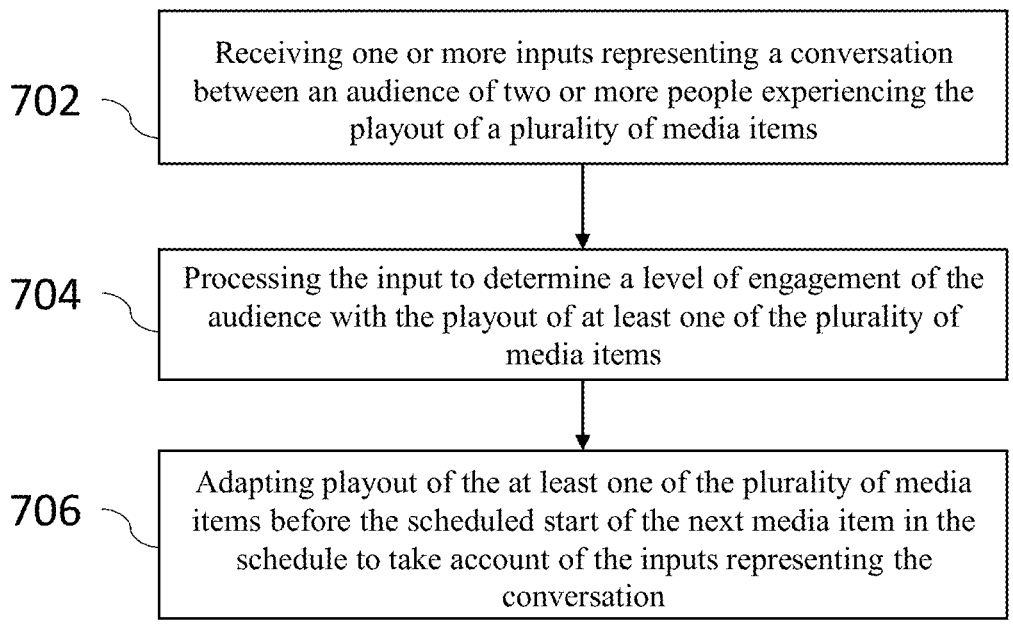
FIG. 7 shows a flowchart of illustrative steps involved in adapting playout of a plurality of media items, in accordance with some embodiments of the disclosure.

FIG. 7 shows a flowchart 700 of illustrative steps involved in adapting playout of a plurality of media items in accordance with some embodiments of the disclosure and in accordance with the systems described above with reference to FIGS. 1 to 6. Flowchart 700 provides a method of adapting a schedule of a plurality of media items to be played by a media player. In step 702, one or more inputs representing a conversation between an audience of two or more people experiencing the playout of the plurality of media items are received. The inputs can represent audio picked up by a microphone or video picked up by a camera (as described above). Following this, the input is processed (for example, by processing circuitry) to determine a level of engagement of the audience with the playout of at least one of the plurality of media items as set out in step 704. In step 706, playout of the at least one of the plurality of media items is adapted before the scheduled start of the next media item in the schedule to take account of the inputs representing the conversation. In an example scenario, adapting playout of the at least one of the plurality of media items may include a user saying, "OK Google, switch off the TV" or "OK Google, play me some recommended YouTube videos in the living room", etc.

Figure 8:
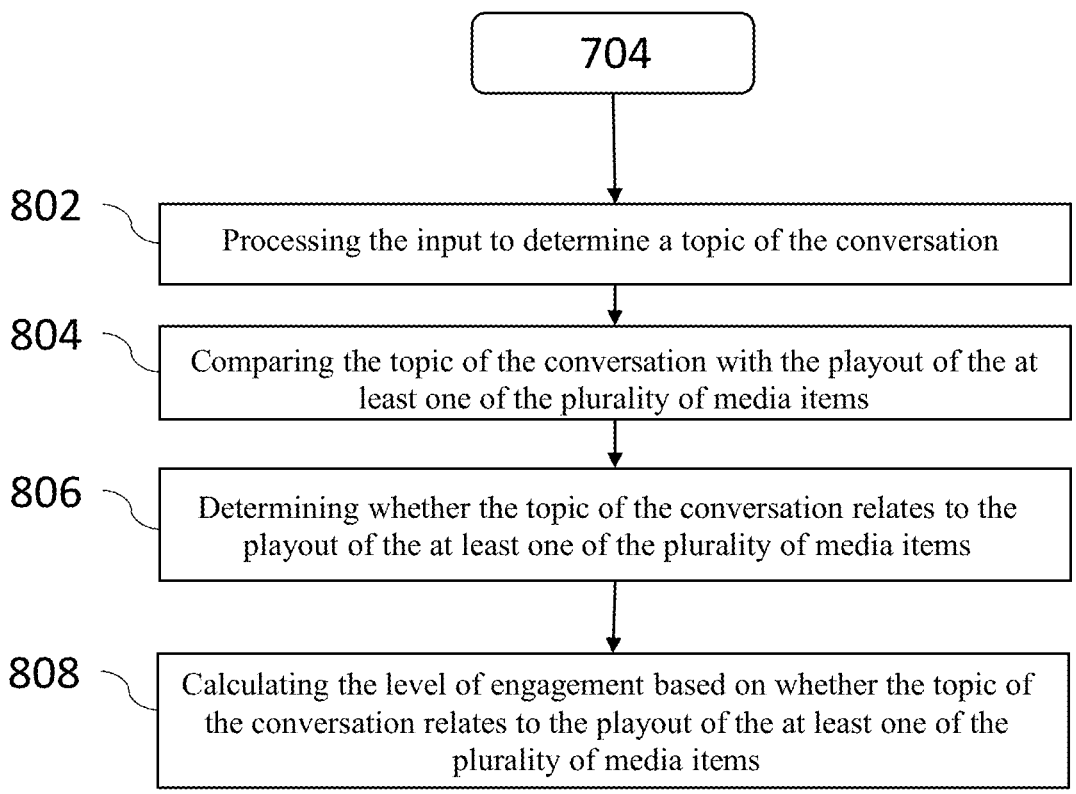
FIG. 8 shows another flowchart of illustrative steps involved in adapting playout of a plurality of media items, in accordance with some embodiments of the disclosure.

FIG. 8 shows a flowchart 800 of illustrative steps involved in adapting playout of a plurality of media items in accordance with some embodiments of the disclosure and in accordance with the systems described above with reference to FIGS. 1 to 7. In some embodiments, processing the input to determine the level of engagement of the audience with the playout of the at least one of the plurality of media items 704 further comprises processing the input to determine a topic of the conversation as set out in step 802 (for example with the use of machine learning). The topic of the conversation can be compared with the playout of the at least one of the plurality of media items as set out in step 804. Subsequently, in step 806, it can be determined whether the topic of the conversation relates to the playout of the at least one of the plurality of media items. Based on whether the topic of the conversation relates to the playout of the at least one of the plurality of media items, the level of engagement can be calculated as set out in step 808. In some embodiments, the input may comprise any one of an audio input, a video input (for example, by speech recognition), and metadata fed into the media player.

In some embodiments, a duration of the conversation can be determined based on the inputs representing the conversation, as has been discussed in detail above. The duration of the conversation can be determined, for example, by feeding the inputs representing the conversation into a speech recognition program. Additionally or alternatively the inputs representing the conversation can be fed into a natural language program to determine the duration of the conversation.

To increase the accuracy of the determination of the duration of the conversation, the inputs representing the conversation can be compared with previously stored metadata by the natural language program and/or speech recognition program. A topic of the conversation can then be determined based on the comparison of the inputs representing the conversation and the previously stored metadata. The stored metadata may comprise topics of conversations, user profile data (for example, personality, expertise level about the topic, level of exposure, interest level about the topic, etc.) of those who participated in the conversation, interest level of the users in the media item they are watching, engagement aspect of the users about the schedule they are watching, geo-location and context, demographics, and the number of people in the conversation. The stored metadata may also comprise natural language processing (NLP) of incoming conversations such as, but not limited to general Trivia, media items about past episodes, and the presence of any stats in the conversations. Furthermore, the stored metadata may also comprise general rhythms of conversations such as, but not limited to, whether all users are equally participating in the conversation (if yes, then it could be interesting enough for users to not break away from it), if users are taking turns in speaking consistently (if yes then it could go long, if not, then the conversation may end quickly).

In some embodiments, metadata can be provided which reflects the level of engagement to be associated with the at least one of the plurality of media items currently being played out. The metadata may be structured such that is consistently passed on to the playback service (for example, a JSON body) enabling the playback service (for example, the content source 516 coupled to the media device 106) to modify the playback of media items via different means, including manipulation of the playlist of manifest file. In some embodiments the playback service can run its own algorithm for determining whether modification of the media item playback is warranted. For example, the metadata from the inputs representing a conversation might indicate that all viewers are equally participating in the conversation. The metadata can also include a flag on whether the conversation is about the content, and if so, it is about the plot, or celebrity gossip, etc. The inputs representing the conversation might also associate a topic with a specific user profile (for example, a demographic profile, voice profile, interest profile, etc.) if such profile is driving the discussion of such topic. For example, during an advertisement break, one of the participants might be talking about an upcoming trip to Disney World. This information can help the playback service to dynamically target that specific profile/user/device with advertisements. For example, the manifest file can be manipulated to instruct the player to request a different advertisement media item then was originally scheduled to be played.

Additionally, based on the inputs representing the conversation that is shared with the server for the machine learning algorithm, the playback service can determine whether the conversation rate is slowing down (for example, the inputs representing the conversation can provide such information in a parameter of the JSON body since an NLP module has all such information while performing the understanding task). A conversation that appears to be dwindling may allow the playback service to play an extra advertisement for example, to give the users enough time to wrap up. The inputs representing a conversation can give a high-level category of the conversation that is taking place, and such topic can be used for relevant advertising.

In some embodiments, playout of the at least one of the plurality of media items before the scheduled start of the next (and subsequent) media item in the schedule is adapted by any one of: adding at least one media item to the schedule, deleting at least one item from the schedule, speeding up the at least one of the plurality of media items in the schedule, slowing down the at least one of the plurality of media items in the schedule, and/or re-ordering the at least one media item in the schedule.

In some embodiments, the plurality of media items can be played by a media player on at least two separate media devices at different locations. Each of the at least two media devices can receive one or more different inputs representing a conversation between an audience of two or more people experiencing the playout of the plurality of media items. Playout of the at least one of the plurality of media items can be adapted to take the inputs representing the conversations between the different locations into account. In some embodiments, a user at one of the locations can be enabled to leave the audience and continue watching the at least one of the plurality of media items without adapting the playout of the at least one of the plurality of media items. Accordingly, the conversation can continue for those users participating in the conversation and for those users participating in the conversation the media playout is adapted (for example, by postponing an interesting media item 606 as shown in FIG. 6 until the conversation is predicted to be over). Meanwhile, the schedule of media items continues without adaptation for the user that is not participating in the conversation. A conversation that is "one-sided"—where not everyone is participating, might result in the playback service giving the option to some viewers to leave the session and resume watching on their own. In such case, the resume point can be saved and used in resuming the content if the viewer accepts to leave the session. The user might already be logged to the service that has the content and therefore a new playback request can be automatically generated on behalf of the user to resume watching on their own (user is automatically disconnected from the first group watch session).

In one embodiment, a cloud-based voice service (for example, Alexa) that is tasked with speech recognition and natural language processing/understanding can communicate/interface with a multimedia playback service (for example, a media device as described above with reference to FIGS. 1 to 5) to alter or modify playback of media items that is currently being played back. In this context, "modify" includes adding/removing segments, adding/removing advertisements or changing advertisement frequency, replacing existing scheduled advertisements with different ones, changing playback speed of a certain segment or segments, lowering volume, "cloning" an existing media session to allow a user to leave the group (e.g., if users are watching content together but are located at different locations—i.e., group watch), etc. Cloning a session allows a user who is not participating in the conversation or is not happy with the pace of content playback to disconnect from the group watch, and automatically resume watching separately. The communication with the playback service's end point can be done via structured requests (for example, a POST request containing a JSON body) that gives the playback service information/metadata to modify the playback.

The metadata can additionally include the number of viewers that are consuming the content which can be done by detecting the number of unique voice or voice profiles or through other means such as the use of video processing to determine the number of people present if video data can be obtained from cameras integrated within the media device or separate but coupled to the media device (for example, by communicating with the communication network 514 as described with reference to FIGS. 1 and 5), the identity of the viewers (for example, if a corresponding voice profile is registered with the voice service—such as Alexa, Siri, etc.), which profiles are actively participating in the conversation (for example, by detecting the length of phrase uttered by a unique voice profile) and for how long user are participating (to help determine the 'lead' conversationalist(s) and to help determine who is not participating). Advantageously this allows the playback service to display a message (for example, in a group watch session) on the media device or media devices of specific users (with an option to transfer the session to their own account or disconnect from the group watch, etc.). Targeting can be done based on the IP address of the media device(s).

In an example scenario two people may be in one location (for example, in one room) watching a movie with three other people in three different locations (i.e., group watch). Smart speakers comprising microphones and/or cameras may be placed at the four different locations, each of the smart speakers being able to receive inputs representing conversations (as described above with reference to FIGS. 1 to 6) which can be provided as input to the machine learning algorithm. The input can be cross-referenced with parameters to determine "conversation IDs" of all four locations. For example, inputs from each of the four different smart speakers can be analyzed for context, identify of the viewers, a determination of who is engaged and for how long. In a group watch setting, the profile IDs of the users watching the content might match the profile ID associated with the smart speaker. In such case, knowing which profiles are watching together allows the machine learning algorithm to merge or use the various conversation IDs when performing the natural language understanding task.

The playback service can use data (for example, inputs representing conversation) shared to it to further augment subscribers' profiles. For example, the sentiment (positive or negative) of a topic that is determined is valuable data for the playback service. Positive sentiment about an actor/actress or a genre can be referred to as implicit feedback to the OTT service. Similarly, depending on the topic of the conversation, the OTT service might refine a subscriber's profile to indicate his or her approval of a brand, etc. All such data can be used by third party advertisers for promotions, advertisements, etc.

Figure 9:
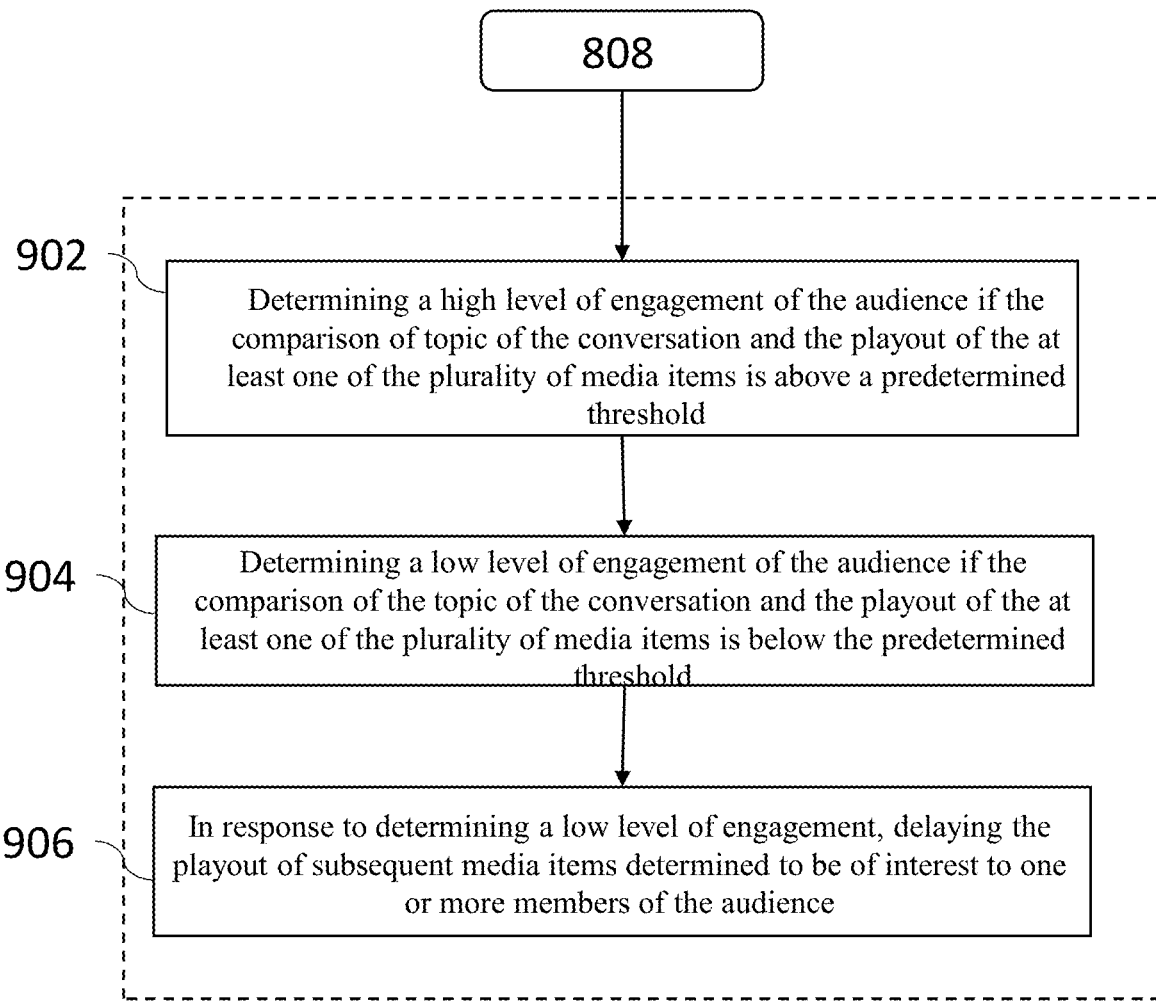
FIG. 9 shows yet another flowchart of illustrative steps involved in adapting playout of a plurality of media items, in accordance with some embodiments of the disclosure.

FIG. 9 shows a flowchart 900 of illustrative steps involved in adapting playout of a plurality of media items in accordance with some embodiments of the disclosure and in accordance with the systems described above with reference to FIGS. 1 to 8. Following on from step 808 of FIG. 8, a high level of engagement of the audience can be determined in some embodiments if the comparison of topic of the conversation and the playout of the at least one of the plurality of media items is above a predetermined threshold as set out in step 902. Alternatively, a low level of engagement of the audience can be determined if the comparison of the topic of the conversation and the playout of the at least one of the plurality of media items is below the predetermined threshold as set out in step 904. In response to determining a low level of engagement, the playout of subsequent media items determined to be of interest to one or more members of the audience can be delayed as set out in step 906, and as discussed above. In some embodiments, the subsequent media items determined to be of interest to one or more members of the audience may be delayed by an amount dependent upon a predicted duration of the conversation.

In some embodiments, an audible interruption may be detected followed by a low level of engagement of the audience. In that scenario, the playout of the at least one of the plurality of media items can either be replayed from the point of interruption or the audience can be provided with an option to replay playout of the at least one of the plurality of media items from the point of interruption.

In one embodiment, a human speech or other sounds can be classified as 'interrupters'—which may result in logging the time within the content that such interrupter occurred. The type of interrupters such as a ring bell, phone ring, etc. is not of great importance—the player or playback service only needs to keep a log of the time within the content playback in response to receiving an 'interruption' flag. Such log can be later used to predict where to replay the content from (in case the user wishes to rewind because he or she believes that they missed something). In a way, these timepoints can act as resume points or "replay from" points and can be used to respond to different query types. For example, a query such as "what did he say"—might replay the content from the last two timepoints in the log if such times points are close to each other. For example, the log indicates times points {34:11, 54:29, 58:19, 58:58}. In such case, the response to "what did he say" is to replay the content from 58:19. In another embodiment, the log also includes indication of scene transitions, associate characters with timepoints—i.e., the log might indicate that timepoint "58:58" is unrelated to "58:19" and therefore the query would replay from "58:58." The log can also indicate that character X was speaking at "58:19," and character Z was speaking at "58:58," etc. All this data can be used to response to queries while taking 'context' into account. It is important to note that such timepoints metadata can be determined in many ways, including the use of closed caption data that indicates which characters are speaking; determining the character that was speaking when the "interruption" signal was received and timepoint was logged, etc.

In yet another embodiment, "interruption" timepoints can be collected form a variety of devices and viewers for analysis. For example, segments or scenes where no or little talking among viewers takes place can be an indication of important scenes or scenes perceived as important by the viewers. Such data can be used to determine ad insertion points, what scenes to include in previews, promotions, etc.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of adapting a schedule of a plurality of media items to be played by a media player, the method comprising:
   detecting, via control circuitry, one or more inputs representing a conversation between an audience of two or more people experiencing playout of a first of the plurality of media items;
   determining a topic of the conversation based on the one or more inputs;
   comparing the topic of the conversation with the playout of the first of the plurality of media items to determine if the topic of the conversation is related, above a predetermined threshold, to the first of the plurality of media items; and
   based on a determination that the comparison of the topic of the conversation and the playout of the first of the plurality of media items exceeds the predetermined threshold:
      (i) processing, by the control circuitry, the one or more inputs to determine a level of engagement of the audience with the playout of the first of the plurality of media items; and
      (ii) delaying a scheduled start of a next media item in the schedule by an amount dependent upon a predicted duration of the conversation based at least in part on the topic of the conversation and the level of engagement.

2. The method of claim 1, wherein the predicted duration of the conversation is based on the one or more inputs representing the conversation.

3. The method of claim 2, wherein determining the predicted duration of the conversation based on the one or more inputs representing the conversation further comprises at least one of:
   feeding the one or more inputs representing the conversation and the duration of the conversation into a speech recognition program; and
   feeding the one or more inputs representing the conversation and the duration of the conversation into a natural language program.

4. The method of claim 3, further comprising:
   comparing, by the natural language program and/or the speech recognition program, the one or more inputs representing the conversation and the predicted duration of the conversation with previously stored metadata; and determining the topic of the conversation based on the comparison of the one or more inputs representing the conversation, the predicted duration of the conversation and the previously stored metadata.

5. The method of claim 1, wherein processing the one or more inputs to determine the level of engagement of the audience with the playout of the first of the plurality of media items further comprises:

processing the one or more inputs to determine the topic of the conversation;

comparing the topic of the conversation with the playout of the first of the plurality of media items;

determining whether the topic of the conversation relates to the playout of the first of the plurality of media items; and calculating the level of engagement based on whether the topic of the conversation relates to the playout of the first of the plurality of media items.

6. The method of claim 5, further comprising:

determining a high level of engagement of the audience if the comparison of the topic of the conversation and the playout of the first of the plurality of media items is above the predetermined threshold;

determining a low level of engagement of the audience if the comparison of the topic of the conversation and the playout of the first of the plurality of media items is below the predetermined threshold; and in response to determining the low level of engagement, delaying the playout of subsequent media items determined to be of interest to one or more members of the audience.

7. The method of claim 6, wherein the predicted duration of the conversation is based on a user profile of at least one of the audience of two or more people.

8. The method of claim 6, further comprising:

detecting an audible interruption followed by the low level of engagement of the audience; and replaying playout of the first of the plurality of media items from a point of interruption or providing the audience an option to replay playout of the first of the plurality of media items from the point of interruption.

9. The method of claim 1, wherein adapting the playout of the first of the plurality of media items before the scheduled start of the next media item in the schedule comprises any one of:

adding at least one media item to the schedule;

deleting at least one item from the schedule;

speeding up the first of the plurality of media items in the schedule;

slowing down the first of the plurality of media items in the schedule; and re-ordering the at least one of the plurality of media items in the schedule.

10. The method of claim 1, wherein the plurality of media items are played by the media player on at least two separate media devices at different locations, and wherein each of the at least two separate media devices receives one or more different inputs representing the conversation between the audience of two or more people experiencing the playout of the plurality of media items.

11. The method of claim 10, further comprising:

adapting playout of the first of the plurality of media items before the scheduled start of the next media item in the schedule to take account of the one or more inputs representing the conversation and a duration of the conversation between the different locations; and enabling a user at one of the locations to leave the audience and continue watching the first of the plurality of media items without adapting the playout of the first of the plurality of media items.

12. The method of claim 1, wherein the detecting of the one or more inputs representing the conversation between the audience of two or more people is performed by a cloud-based voice service.

13. The method of claim 1, further comprising:

determining a number of unique voice profiles associated with the one or more inputs;

determining a user profile associated with each of the unique voice profiles; and updating each respective user profile based on the one or more inputs.

14. The method of claim 13, wherein each respective user profile is augmented based either a positive sentiment or a negative sentiment determined based on at least one of the one or more inputs that is attributed to a corresponding unique voice profile.

15. The method of claim 1, further comprising:

determining, based on the one or more inputs, an interruption;

determining a playback position of the first of the plurality of media items at the time of the interruption; and storing, in a memory, the playback position at the time of the interruption for future access to allow for a resumption of the playout of the first of the plurality of media items at the playback position.

16. A system for adapting a schedule of a plurality of media items to be played by a player comprising:

a microphone;

a memory, for storing instructions; and control circuitry communicably coupled to the memory and the microphone, and configured to:

detect one or more inputs representing a conversation between an audience of two or more people experiencing playout of a first of the plurality of media items;

determine a topic of the conversation based on the one or more inputs;

compare the topic of the conversation with the playout of the first of the plurality of media items to determine if the topic of the conversation is related, above a predetermined threshold, to the first of the plurality of media items; and based on a determination that the comparison of the topic of the conversation and the playout of the first of the plurality of media items exceeds the predetermined threshold:

(i) process the one or more inputs to determine a level of engagement of the audience with the playout of the first of the plurality of media items; and (ii) delay a scheduled start of a next media item in the schedule by an amount dependent upon a predicted duration of the conversation based at least in part on the topic of the conversation and the level of engagement.

17. The system of claim 16, wherein the control circuitry is further operable to:

compare, by a natural language program and/or the speech recognition program, the one or more inputs representing the conversation and the predicted duration of the conversation with previously stored metadata; and determine the topic of the conversation based on the comparison of the one or more inputs representing the conversation, the predicted duration of the conversation and the previously stored metadata.

18. The system of claim 16, wherein the control circuitry is further configured to process the one or more inputs to determine the level of engagement of the audience with the playout of the first of the plurality of media items by:
processing the one or more inputs to determine the topic of the conversation;
comparing the topic of the conversation with the playout of the first of the plurality of media items;
determining whether the topic of the conversation relates to the playout of the first of the plurality of media items; and
calculating the level of engagement based on whether the topic of the conversation relates to the playout of the first of the plurality of media items.

19. The system of claim 16, wherein the control circuitry is configured to adapt the playout of the first of the plurality of media items before the scheduled start of the next media item in the schedule by performing any one of:
adding at least one media item to the schedule;
deleting at least one item from the schedule;
speeding up the first of the plurality of media items in the schedule;
slowing down the first of the plurality of media items in the schedule; and
re-ordering the at least one of the plurality of media items in the schedule.

* * * * *